United States Patent Office 3,519,687
Patented July 7, 1970

3,519,687
CONTROLLED MOLECULAR WEIGHT AZIRIDINE POLYMERS
James G. Schneider, Angleton, and Clarence R. Dick and George E. Ham, Lake Jackson, Tex., assignors to The Dow Chemical Company, Midland, Mich., a corporation of Delaware
No Drawing. Filed June 20, 1966, Ser. No. 558,555
Int. Cl. C07c 85/00, 87/20, 87/28
U.S. Cl. 260—570.4       11 Claims

ABSTRACT OF THE DISCLOSURE

A process for preparing aziridine polymers from an aziridine and a primary or secondary amine or an amine having both primary and secondary amine functionality, wherein the average molecular weight of the polymers thus obtained may be calculated from the mole ratio of aziridine to amine reacted comprises digesting the aziridine and amine in the presence of an acid catalyst at a temperature between about 0° and 200° C., either in the presence or absence of water. The resulting polymers have molecular weights between about 300 and about 3,000. A variety of amines and both C-substituted and N-substituted aziridines are included in the specific examples. The preferred aziridine is ethylenimine and the preferred amine is ethylenediamine.

When no water is present, novel polymers having a minimum hydroxyl content are prepared.

---

The present invention relates to novel aziridine polymers having controlled molecular weights and to a process for preparing them. More particularly, it relates to novel aziridine polymers and a process for preparing them from an aziridine and a primary or secondary amine, wherein the molecular weight of the aziridine polymer so prepared may be controlled by varying the mole ratio of the aziridine to the primary or secondary amine.

Polymeric products prepared from an aziridine and a primary or secondary amine are known in the art. Polymers of, for example, ethylenimine (hereinafter EI) and ethylenediamine (hereinafter EDA) are disclosed in U.S. Pat. 2,318,729, issued May 11, 1943, and are prepared by heating EDA and EI in an aqueous solution with no other catalyst than the water. French patent 957,308, published Feb. 16, 1950, discloses a process for preparing high molecular weight polymers of EDA and EI which comprises reacting the EDA and EI in the presence of an acid polymerization catalyst. The polymers so produced have an average molecular weight of at least 10,000.

It has now been discovered that aziridine polymers having a predetermined average molecular weight in the range between about 300 and about 3,000 may be prepared from an aziridine and a primary or secondary amine or an amine having both primary and secondary amine functionality. The average molecular weight of the resulting polyamine may be calculated from the mole ratio of aziridine to primary or secondary amine reacted according to the relationship:

Average Molecular Weight
$$=\left(\frac{\text{Moles Aziridine}}{\text{Moles Amine}} \times \begin{array}{c}\text{Molecular}\\ \text{weight of}\\ \text{aziridine}\end{array}\right) + \begin{array}{c}\text{Molecular}\\ \text{weight of}\\ \text{amine}\end{array}$$

The novel process of this invention comprises digesting, in the presence of an acid polymerization catalyst at a temperature between about 0° and about 200° C. for a time sufficient to allow the resulting polymerization reaction to go to substantial completion, a mixture of an aziridine and a primary or secondary amine in a mole ratio which will give a calculated average molecular weight according to the above formula between about 300 and about 3,000. The preferred temperature range is from about 25° to about 150° C. Polymerization according to the novel process of this invention may be carried out in the absence of a solvent or in the presence of a water solvent. To prepare novel polymers having a minimum hydroxyl content, no water solvent is used.

The novel polymeric aziridines having a minimum hydroxyl content may be represented by the formula:

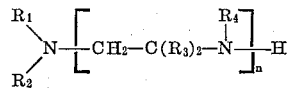

wherein $n$ is an integer of from about 6 to about 70, and $R_1$ and $R_2$ are, independently, hydrogen or an alkyl, aralkyl, cycloalkyl, unsaturated olefinic-, cyano-, hydroxyl-, or amine-substituted alkyl, aralkyl, or cycloalkyl group containing from 1 to about 20 carbon atoms. $R_1$ and $R_2$ may be bonded to form a cyclic group. However, when such a cyclic group is an aziridine ring, the molecular weight of the polymer obtained cannot be predicted from the mole ratio of aziridine to primary or secondary amine. $R_3$ is hydrogen or an alkyl group of from 1 to 4 carbon atoms; $R_4$ is hydrogen or an alkyl, aralkyl, alkaryl, cycloalkyl, aryl, or unsaturated olefinic-, cyano-, hydroxyl-, or amine-substituted alkyl, aralkyl, alkaryl, cycloalkyl, or aryl group containing from 1 to about 20 carbon atoms. Preferably, $R_1$ and $R_2$ in the above formula are hydrogen, aminoethyl, hydroxyethyl, n-dodecyl, n-butyl, allyl or cyclohexyl groups, $R_3$ is hydrogen or methyl, and $R_4$ is hydrogen, hydroxyethyl, allyl, or phenethyl. The polymeric aziridines of the present invention contain, in addition to the hydroxyl groups previously defined, less than about 0.1 percent by weight hydroxyl groups when prepared under essentially anhydrous conditions. Some water, i.e., that introduced by an aqueous acid catalyst solution, may be present when the polymerization takes place.

The above general formula is merely representative of the polymers obtained. Branching may and does occur in the actual products obtained.

Suitable aziridine compounds for the process of the present invention include, beside EI, both C- and N-substituted aziridines. Suitable specific examples of C-substituted aziridines for the practice of this invention are disclosed, for example in Jones, "The Polymerization of Olefin Imines," in P. H. Plesch, ed. The Chemistry of Cationic Polymerization, New York, MacMillan, (1963) pages 521–534. They include: 2-methylethylenimine, 2-ethylethylenimine, 2,2-dimethylethylenimine, and the like. Suitable examples of N-substituted aziridines and methods for preparing them are disclosed by H. Bestian, Annalen 566, 210 (1950); C. A. 44, 5805 (1950). They include: the N-alkyl derivatives of ethylenimine, such as N - methylethylenimine, N - ethylethylenimine, N-butylethylenimine, and the like; the N-hydroxyalkyl derivatives of ethylenimine such as N-(2-hydroxyethyl)ethylenimine, N - (2 - hydroxypropyl)ethylenimine, N - (2 - hydroxybutyl)ethylenimine, and the like; ethylenimine substituted with groups containing a double bond such as N-allylethylenimine, and the like; N-substituted ethylenimines containing an aralkyl or alkaryl group, such as N - (2-phenethyl)ethylenimine; N-(2-ethylphenyl)ethylenimine, and the like. The aziridine may also contain such substituents as indicated above on both the carbon and nitrogen atoms.

Suitable examples of primary and secondary amines and amines of both primary and secondary functionality which may be reacted with the aziridine compounds according to the process of the present invention include certain aralkyl amines such as benzyl amine, phenethyl amine, and the like; aliphatic amines, such as diethyl amine, butyl amine, dibutyl amine, ethylendiamine, diethylentriamine, ethanol amine, diethanol amine, isopropanol amine, octyl amine, dioctyl amine, and the like; cyclic amines such as morpholines, cyclohexyl amine, piperazine, and the like; miscellaneous amino compounds such as diaminodiethyl ether, diaminodiethylsulfide, sodium glycinate, phenyl hydrazine, low molecular weight polyethylenimines, e.g. those having a molecular weight between about 300 and 2000, and the like. Certain of the aromatic amines, such as aniline and its derivatives, naphthylamine, and others wherein the amine group is attached directly to an aromatic nucleus, will not give a predictable molecular weight based on the mole ratio of amines to aziridines. Such compounds are therefore excluded from the present invention.

In general, any strong inorganic, organic, or Lewis acid catalyst is suitable for the process of the present invention. Examples of suitable acid catalysts include mineral acids, such as hydrochloric acid, hydrobromic acid, sulfuric acid, and the like; organic acids, such as p-toluenesulfonic acid, trichloroacetic acid, trifluoroacetic acid and the like; strongly acidic ion-exchange resins, such as the acidic Amberlite sulfonic acid ion-exchange resins sold by the Rohm and Haas Company, the acidic Dowex 50 sulfonic acid ion-exchange resins, Lewis acids, such as aluminum trichloride, and the like.

The list of reactants and catalysts given above are intended to be representative rather than exclusive.

In practice, the process of the present invention is desirably carried out by adding one of the reactants dropwise to the other over a period of several hours, in a ratio of aziridine to amine which will give a molecular weight in the resulting product between about 300 and about 3,000 as calculated by the relationship given previously. For example, to prepare a polyamine having a molecular weight of about 600 from ethylenediamine, a mole ratio of EI to ethylenediamine of about 12.6 to 1 is necessary. The mixture of reactants and acid catalyst is digested for a time sufficient to allow the polymerization reaction to go to substantial completion. The time necessary to insure completion of the polymerization will depend on the structure of the aziridine, the amount of amines present, the temperature, the solvent, if any, and the catalyst concentration. Times of from about 30 minutes ot about 70 hours have been found operable.

In general, the process of the present invention is operable at temperatures within the range from about 0° C. to about 200° C. At temperatures above about 150° C., polymers prepared from N-alkyl aziridines tend to degrade in the presence of acid catalysts. The preferred temperature range is from about 25° to 150° C.

The acid polymerization catalyst is used in an amount necessary to induce the polymerization reaction (hereinafter a catalytic amount). For the polymerization to be carried out within practical time limits, from about 0.01 percent by weight up to about 10 percent by weight as acid catalyst of the total charge is necessary. It is preferred to keep the catalyst concentration as low as possible and yet in a range where a reasonable reaction rate is obtained. The preferred range for the catalyst is from about 0.1 to about 5 percent by weight of the total charge.

The ability of the claimed process to produce polymers of molecular weight predicted from the mole ratio of aziridine to amine appears to be limited to production of polyamines having a molecular weight between about 300 and about 3,000. At mole ratios of aziridine to amine such that the calculated molecular weight would be higher than about 3,000, the polymer is always of much lower molecular weight than predicted.

The polymers prepared by the process of the present invention are all viscous, clear liquids with an amine functionality useful for curing epoxy resin. They impart to the cured resin different properties depending on the choice of amine end groups and molecular weight. The polymers of this invention should be particularly useful as curing agents for epoxy resins, due to the minimum hydroxyl content specified previously. They are also useful for various adhesive formulations, as intermediates for the preparation of surface active agents, and as reagents in coating compositions.

The following examples described completely representative specific embodiments and the best modes contemplated by the inventors for practicing the claimed invention. The invention is, however, limited only by the scope of the claims appended hereto.

The general procedure used for the examples is as follows:

The amine and acid catalyst are added to a reaction vessel fitted with a stirrer, reflux condenser, and temperature controlling means. The aziridine is added dropwise over a period of from 1 to 3 hours and the polymerization allowed to proceed for two to sixty-eight additional hours. After polymerization is complete, the product is cooled, the molecular weight is determined by ebullioscopy and the structure of the product confirmed by infrared spectroscopy.

Table I shows the results obtained by reacting a series of amines with ethylenimine (EI) as the aziridine.

TABLE I

| | | Polymerization of EI with Primary and Secondary Amines | | | | | | |
|---|---|---|---|---|---|---|---|---|
| Amine | Wt. percent of charge as amine | Mole ratio, EI/ amine | HCl catalyst, wt. percent of charge | Reaction temp., °C. | Reaction time, hrs. | Obtained molecular weight | Calculated molecular weight | ± Percent deviation [a] |
| Example: | | | | | | | | |
| 1 ..... Ethylene diamine | 20.1 | 5.47 | 0.52 | 85–94 | 6 | 275 | 295 | −6.78 |
| 2 ..... do | 10.1 | 12.6 | 0.50 | 81–98 | 6 | 620 | 600 | +3.33 |
| 3 ..... do | 5.24 | 25.1 | 0.54 | 85–95 | 7 | 1,130 | 1,140 | −0.88 |
| 4 ..... do | 3.8 | 34.4 | 0.50 | 83–109 | 6.5 | 1,705 | 1,540 | +10.71 |
| 5 ..... do | 2.06 | 61.1 | 0.50 | 84–120 | 7.5 | 2,400 | 2,690 | −10.78 |
| 6 ..... PEI, mol. wt. 617 | 46.7 | 16.3 | 0.50 | 67–110 | 20 | 1,450 | 1,320 | +9.85 |
| 7 ..... do | 34.0 | 28.2 | 0.50 | 81–104 | 7.5 | 1,930 | 1,830 | +5.46 |
| 8 ..... Ethanolamine | 6.1 | 22.2 | 0.51 | 60–96 | 23 | 914 | 1,015 | −9.95 |
| 9 ..... Diethanolamine | 10.6 | 20.3 | 0.51 | 60–94 | 22 | 910 | 980 | −7.15 |
| 10 ..... Benzylamine | 10.7 | 29.8 | 0.51 | 65–94 | 22 | 1,150 | 1,000 | +15.00 |
| 11 ..... Allylamine | 5.7 | 22.2 | 0.55 | 60–100 | 35 | 1,170 | 1,010 | +15.82 |
| 12 ..... n-Butylamine | 7.25 | 21.9 | 0.50 | 65–100 | 23 | 925 | 1,014 | −8.77 |
| 13 ..... N-dodecylamine | 18.4 | 19.1 | 0.61 | 65–104 | 26 | 850 | 1,005 | −15.41 |
| 14 ..... Cyclohexylamine | 9.9 | 21.1 | 0.51 | 67–92 | 24 | 1,050 | 1,008 | +4.00 |

[a] Calculated from the relationship: $\dfrac{\text{Molecular Weight Obtained} - \text{Molecular weight Calculated}}{\text{Molecular Weight Calculated}} \times 100$.

Table II shows the results obtained by reacting ethylenediamine (EDA) with a series of N-substituted aziridines and a C-substituted aziridine.

TABLE II

Polymerization of Substituted Aziridines with EDA

| Example | Aziridine | Wt. percent of charge as EDA | Mole ratio aziridine EDA | Catalyst | Catalyst wt. percent of total charge | Reaction temp., °C. | Reaction time, hrs. | Obtained molecular weight | Calculated molecular weight | ± Percent deviation [1] |
|---|---|---|---|---|---|---|---|---|---|---|
| 15 | N-(2-hydroxyethyl)ethylenimine | 5.9 | 11.2 | HCl | 0.55 | 72-115 | 6 | 1,025 | 1,015 | +0.99 |
| 16 | N-(2-phenethyl) ethylenimine | 6.0 | 6.46 | HCl | 0.51 | 65-115 | 68 | 815 | 1,010 | −19.30 |
| 17 | do | 11.0 | 3.30 | HCl | 0.49 | 100-150 | 4 | 520 | 545 | −4.59 |
| 18 | do | 8.86 | 4.20 | p-TsOH [2] | 2.56 | 100-150 | 2 | 600 | 678 | −11.51 |
| 19 | do | 3.85 | 10.2 | p-TsOH [2] | 2.70 | 100 | 2.5 | 1,550 | 1,560 | −0.64 |
| 20 | do | 3.24 | 12.2 | p-TsOH [2] | 1.38 | 100 | 5 | 1,750 | 1,850 | −5.41 |
| 21 | N-allylethylenimine | 5.85 | 11.7 | HCl | 0.58 | 65-95 | 28 | 1,130 | 1,030 | +9.70 |
| 22 | 2-methylethylenimine | 6.0 | 16.5 | HCl | 0.51 | 73-125 | 46 | 830 | 1,000 | −17.00 |

[1] Calculated from the relationship: $\dfrac{\text{Molecular Weight Obtained, Molecular Weight Calculated}}{\text{Molecular Weight Calculated}} \times 100$.

[2] p-TsOH = p-toluenesulfonic acid monohydrate.

Table III shows the results obtained from the polymerization of EDA and EI when water is used as the solvent.

TABLE III

Water Solvent for EDA-EI Polymerization

| Example | Wt. percent composition of reaction mixture | Reaction Temp., °C. | Reaction Time, hr. | Obtained molecular weight | Calculated molecular weight | ± percent deviation [1] |
|---|---|---|---|---|---|---|
| 23 | 3.0% EDA<br>46.8% EI<br>49.7% H₂O<br>0.51% HCl | 68-100 | 22 | 945 | 1,020 | −7.35 |
| 24 | 1.54% EDA<br>23.3% EI<br>74.5% H₂O<br>0.68% HCl | 75-98 | 20 | 928 | 980 | −5.31 |

[1] Calculated from the relationship:
$\dfrac{\text{Molecular Weight Obtained, Molecular Weight Calculated}}{\text{Molecular Weight Calculated}} \times 100$.

EXAMPLE 25

A reaction of EDA and EI is carried out with bulk mixing rather than slow addition of the EI. A mixture of 156.4 g. EI, 9.94 g. EDA and 1.06 g. HCl is heated at 50° C. for 24 hours to effect polymerization. After heating for two additional hours at 100° C., the product is cooled to room temperature. The polymerization is smooth, with no appreciable exotherm, and the product is similar in appearance and viscosity to other products made using ethylene diamine.

If only 156.4 g. of EI and 1.06 g. of HCl is heated together at 50° C. without an amine present in the mixture, the result is a violent exothermic polymerization.

The above examples show that controlled molecular weight polyamines having molecular weights between about 300 and about 3,000 may be prepared from a variety of primary and secondary amines and a variety of C-substituted and N-substituted aziridines.

What is claimed is:

1. A process for preparing an aziridine polymer having an average molecular weight between about 300 and about 3,000 from an aziridine and a primary or secondary amine or an amine having both primary and secondary functionality, wherein the average molecular weight of the resulting polyamine may be calculated from the mole ratio of the aziridine to primary or secondary amine present according to the relationship:

Average Molecular Weight
$= \left(\dfrac{\text{Moles Aziridine}}{\text{Moles Amine}} \times \text{Molecular Weight of Aziridine}\right)$
$+ \text{Molecular Weight of Amine}$ said process which comprises digesting, under essentially anhydrous conditions, in the presence of a catalytic amount of an acid polymerization catalyst, at a temperature between about 0° and about 200° C., for a time sufficient to allow the resulting polymerization reaction to go to substantial completion, a mixture comprising an aziridine and a primary or secondary amine in a mole ratio which will give a calculated average molecular weight according to the above relationship between about 300 and about 3,000.

2. A process as in claim 1 wherein the mixture is digested at a temperature between about 25° and about 150° C.

3. A process as in claim 1 wherein the aziridine is ethylenimine, 2-methylethylenimine, 1-(2-hydroxyethyl) ethylenimine, 1 - allylethylenimine or 1 - (2-phenethyl) ethylenimine.

4. A process as in claim 1 wherein the amine is ethylene diamine, diethylene triamine, polyethylenimine having a molecular weight between about 300 and about 2000, ethanol amine, N-dodecyl amine, N-butyl amine, allyl amine, benzyl amine, or cyclohexyl amine.

5. A process as in claim 1 wherein the aziridine is ethylenimine.

6. A process as in claim 1 wherein the amine is ethylene diamine, diethylene triamine, or polyethylenimine having a molecular weight between about 300 and about 2,000.

7. A process as in claim 1 wherein the aziridine is ethylenimine and the amine is ethylene diamine, diethylene triamine, or polyethylenimine having a molecular weight between about 300 and about 2,000.

8. A process as in claim 1 wherein said aziridine is ethylenimine, 2-methylethylenimine, 2,2 - dimethylethylenimine, or the corresponding 1-(2-hydroxyethyl), 1-allyl or 1-(2-phenethyl) derivatives thereof and wherein said amine is ethylenediamine, ethanolamine, n-dodecylamine, n-butylamine, allylamine, cyclohexylamine, or the corresponding N-(2-aminoethyl), N - (2-hydroxyethyl), N-

(n-dodecyl), N-(n-butyl), N-allyl or N-cyclohexyl derivative thereof, or ammonia.

9. A process as in claim 1 wherein the aziridine is ethylenimine, 2-methylethylenimine, 1-(2 - hydroxyethyl) ethylenimine, 1-allylethylenimine, or 1 - (2 - phenethyl) ethylenimine; and the amine is ethylene diamine, diethylene triamine, polyethylenimine having a molecular weight between about 300 and about 2,000, ethanol amine, N-dodecyl amine, N-butyl amine, allyl amine, benzyl amine, or cyclohexyl amine.

10. A process as in claim 1 wherein the aziridine is ethylenimine and the amine is ethylene diamine.

11. A process as in claim 1 wherein said aziridine is 1-(2-phenethyl) ethylenimine and wherein said amine is ethylenediamine.

References Cited

UNITED STATES PATENTS

| | | | |
|---|---|---|---|
| 2,279,294 | 4/1942 | Hardman | 260—563 |
| 2,408,332 | 9/1946 | Morgan. | |
| 3,275,554 | 9/1966 | Wagenaar. | |

CHARLES B. PARKER, Primary Examiner

R. L. RAYMOND, Assistant Examiner

U.S. Cl. X.R.

260—2, 239, 247.5, 268, 464, 465, 465.5, 563, 583, 584